US011283839B2

(12) United States Patent
Raphael et al.

(10) Patent No.: US 11,283,839 B2
(45) Date of Patent: Mar. 22, 2022

(54) ENFORCEMENT KNOWLEDGE GRAPH-BASED DATA SECURITY RULE CHANGE ANALYSIS

(71) Applicant: International Business Machines Corporation, Armonk, NY (US)

(72) Inventors: Roger C. Raphael, San Jose, CA (US); Iun Veng Leong, Union City, CA (US); Angineh Aghakiant, San Jose, CA (US); Immalla Grace Chen, Sterling, VA (US); Scott Schumacher, Porter Ranch, CA (US)

(73) Assignee: International Business Machines Corporation, Armonk, NY (US)

( * ) Notice: Subject to any disclaimer, the term of this patent is extended or adjusted under 35 U.S.C. 154(b) by 268 days.

(21) Appl. No.: 16/705,775

(22) Filed: Dec. 6, 2019

(65) Prior Publication Data

US 2021/0176279 A1 Jun. 10, 2021

(51) Int. Cl.

*H04L 41/22* (2022.01)
*H04L 9/06* (2006.01)
*H04L 29/06* (2006.01)

(52) U.S. Cl.

CPC ............ *H04L 63/20* (2013.01); *H04L 9/0643* (2013.01); *H04L 41/22* (2013.01); *H04L 63/102* (2013.01); *H04L 63/107* (2013.01)

(58) Field of Classification Search

CPC ..... H04L 63/20; H04L 63/102; H04L 63/107; H04L 9/0643
USPC .............................................................. 726/4
See application file for complete search history.

(56) References Cited

U.S. PATENT DOCUMENTS

| | | | |
|---|---|---|---|
| 7,567,915 | B2 | 7/2009 | Hammitt et al. |
| 8,407,253 | B2 | 3/2013 | Ryu et al. |
| 9,864,587 | B2 | 1/2018 | Agrawal et al. |
| 10,078,651 | B2 | 9/2018 | Kelly et al. |
| 2018/0342007 | A1* | 11/2018 | Brannigan et al. |
| 2020/0057946 | A1* | 2/2020 | Singaraju et al. |

OTHER PUBLICATIONS

Steinert et al., "Online Vision- and Action-Based Object Classi cation Using Both Symbolic and Subsymbolic Knowledge Representations," ArXiv, Oct. 2, 2015, 8 pages. https://arxiv.org/pdf/1510.00604.pdf.

Hipp et al., "Algorithms for Association Rule Mining—A General Survey and Comparison," SIGKDD Explorations, Jul. 2000, vol. 2, Issue 1, pp. 58-64.

(Continued)

*Primary Examiner* — Anthony D Brown
(74) *Attorney, Agent, or Firm* — Yee & Associates, P.C.

(57) ABSTRACT

Predicting access impact of a plurality of rule changes on a corpus of information assets is provided. A set of affected rules in a new rule space for controlling access to the corpus of information assets is received. The set of affected rules is shredded to identify right-hand side terms contained in predication blocks of the set of affected rules. An enforcement knowledge graph is traversed to identify a set of hot information assets having same terms as the right-hand side terms of the set of affected rules. The set of hot information assets having the same terms as the right-hand side terms of the set of affected rules is added to a hash table of hot information assets.

20 Claims, 13 Drawing Sheets

(56) References Cited

OTHER PUBLICATIONS

Fisher, "Knowledge Acquisition Via Incremental Conceptual Clustering," Machine learning, Sep. 1987, vol. 2, Issue 2, pp. 139-172. http://www.inf.ufrgs.br/~engel/data/media/file/Aprendizagem/Cobweb.pdf

* cited by examiner

ENFORCEMENT KNOWLEDGE GRAPH-BASED DATA SECURITY RULE CHANGE ANALYSIS

BACKGROUND

1. Field

The disclosure relates generally to data security and more specifically to analyzing and predicting the impact of a plurality of data security policy rule changes, on information asset access by data users, prior to committing the plurality of data security policy rule changes using an enforcement knowledge graph.

2. Description of the Related Art

A chief data officer of the organization defines data access compliance policies (e.g., rules and regulations). The chief data officer is usually an organization executive responsible for organization wide governance and utilization of data as an information asset, via data processing, data analytics, data mining, data distribution, and the like. The chief data officer controls the access to the organization's data by defining the data access compliance policies, such as General Data Protection Regulation policies, Data Loss Prevention policies, Data Protection policies, and the like, for enforcement by a computer system. The computer system captures the chief data officer-defined data access policies as executable rules. Before access to any information asset, the computer system checks the executable rules to determine an access enforcement decision as to whether to allow or deny, or appropriately transform as dictated by the policy, access to a particular information asset.

SUMMARY

According to one illustrative embodiment, a computer-implemented method for predicting access impact of a plurality of rule changes on a corpus of information assets is provided. A computer receives a set of affected rules in a new rule space for controlling access to the corpus of information assets. The computer shreds the set of affected rules to identify right-hand side terms contained in predication blocks of the set of affected rules. The computer traverses an enforcement knowledge graph to identify a set of hot information assets having same terms as the right-hand side terms of the set of affected rules. The computer adds the set of hot information assets having the same terms as the right-hand side terms of the set of affected rules to a hash table of hot information assets. According to other illustrative embodiments, a computer system and computer program product for predicting access impact of a plurality of rule changes on a corpus of information assets are provided.

DETAILED DESCRIPTION

Figure 1:
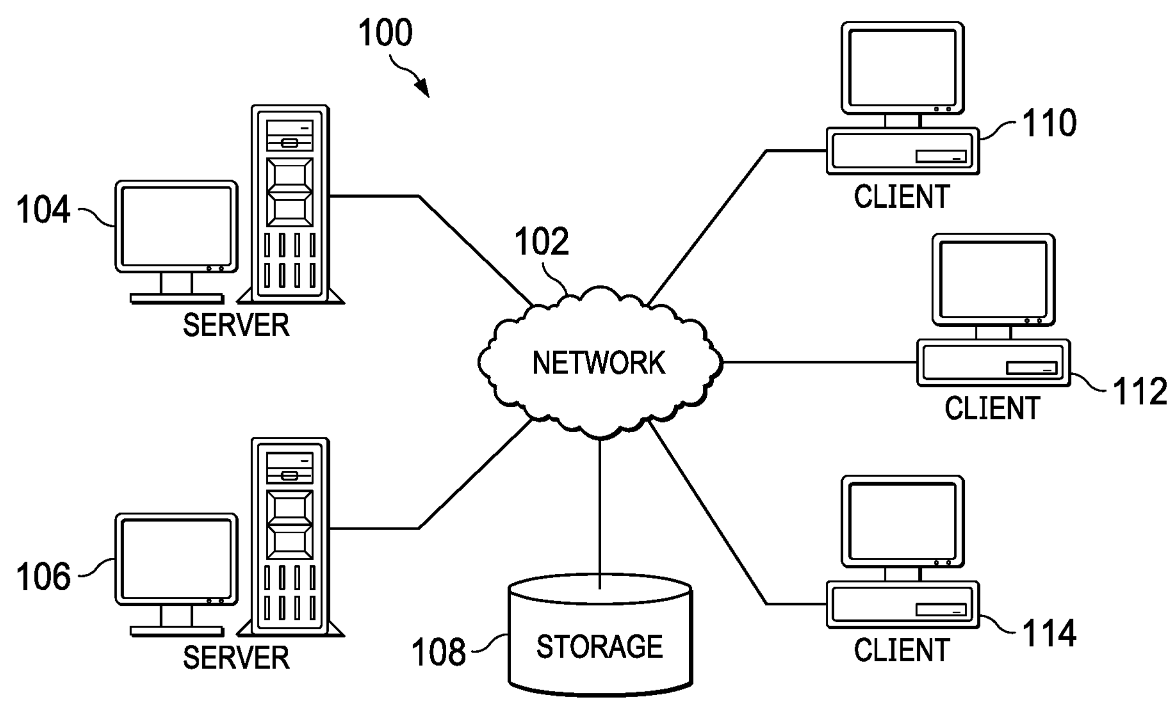
FIG. 1 is a pictorial representation of a network of data processing systems in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
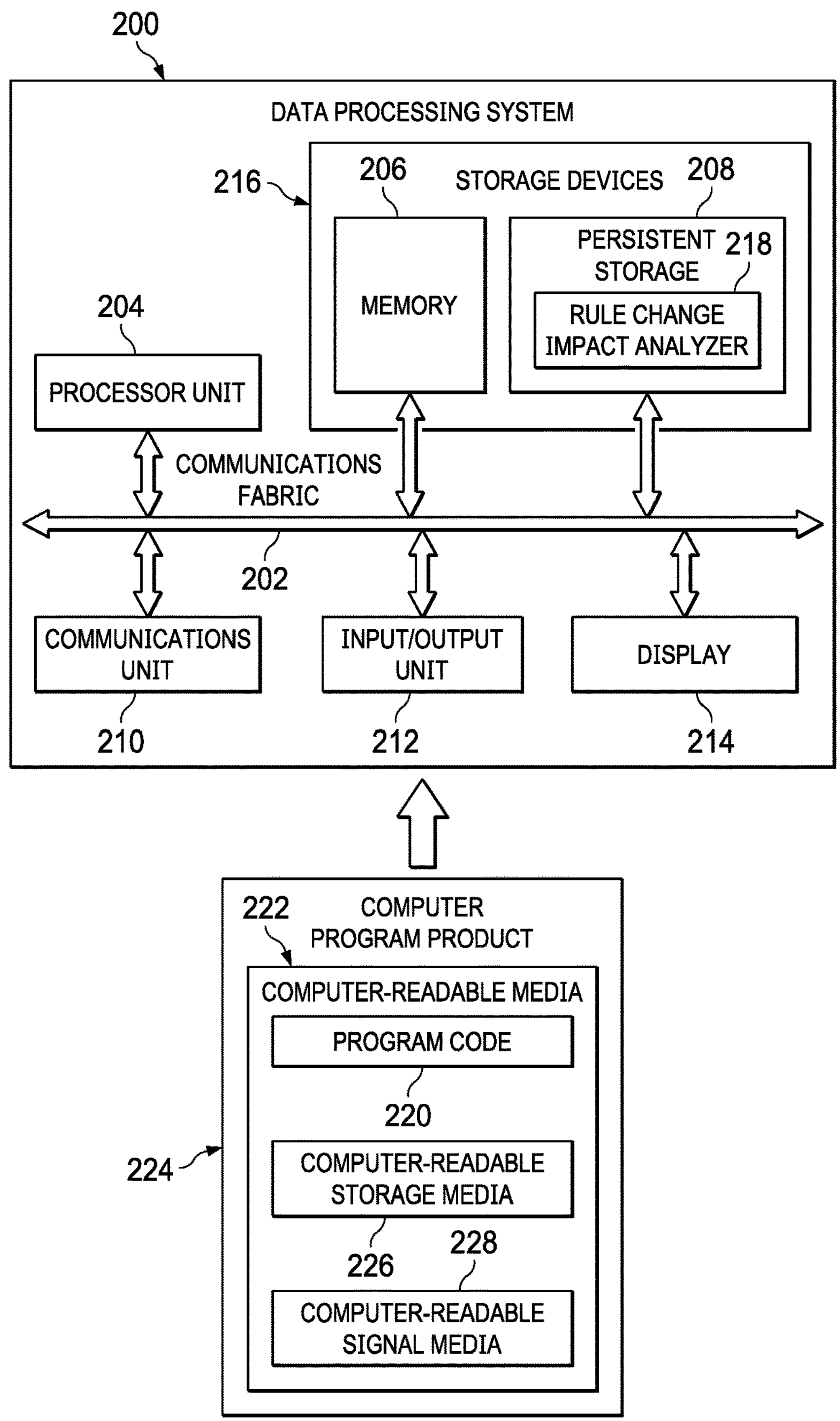
FIG. 2 is a diagram of a data processing system in which illustrative embodiments may be implemented.
Figure 3:
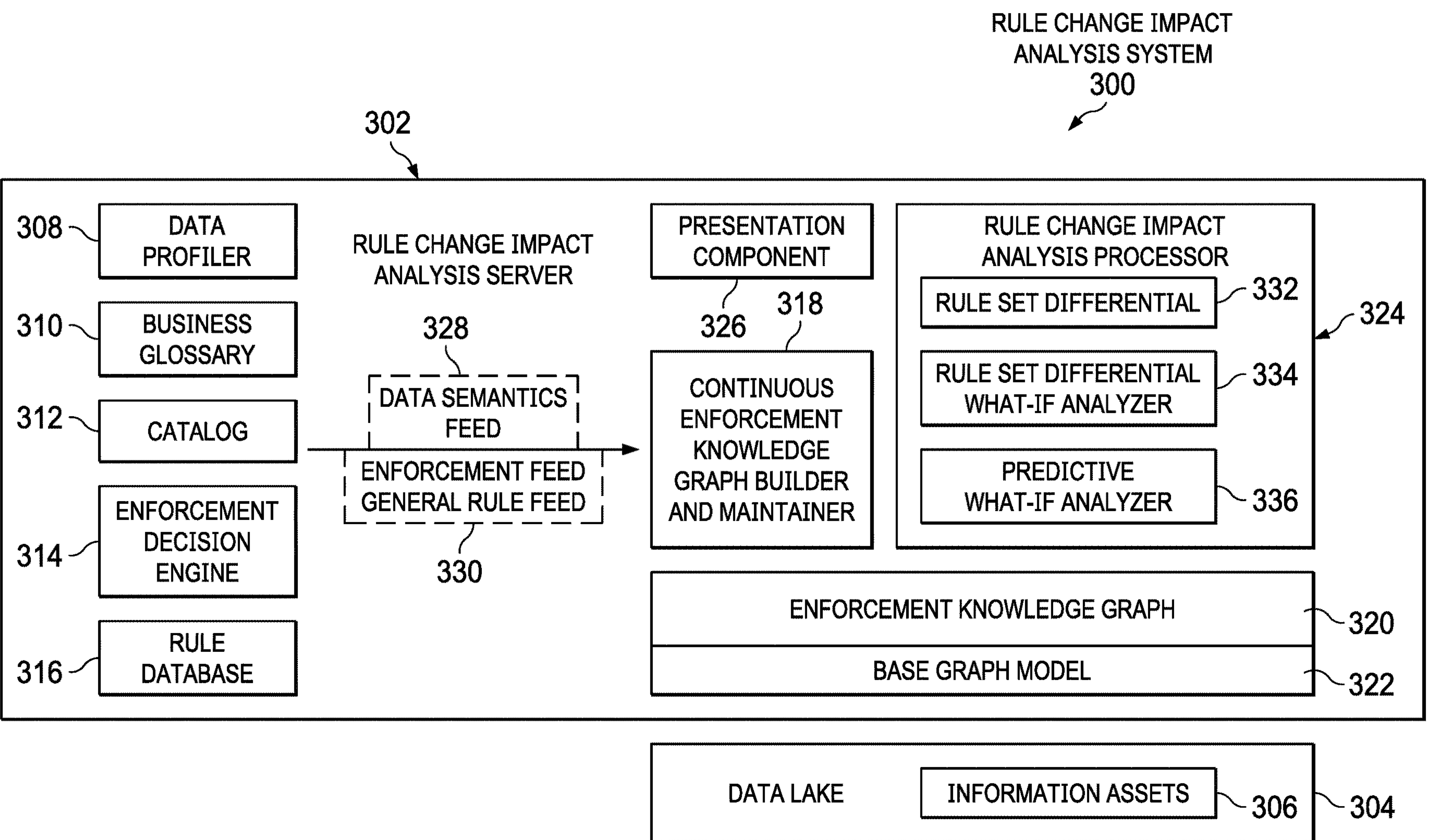
FIG. 3 is a diagram illustrating an example of a rule change impact analysis system in accordance with an illustrative embodiment.

With reference now to the figures, and in particular, with reference to FIGS. 1-3, diagrams of data processing environments are provided in which illustrative embodiments may be implemented. It should be appreciated that FIGS. 1-3 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, fiber optic cables, and the like.

In the depicted example, server 104 and server 106 connect to network 102, along with storage 108. Server 104 and server 106 may be, for example, server computers with high-speed connections to network 102. In addition, server 104 and server 106 provide data security rule change impact analysis services to client device users. Server 104 and server 106 provide the data security rule change impact analysis services by using information contained in an enforcement knowledge graph to predict the impact of the data security rule changes on information asset access by users prior to a chief data officer committing the data security rule changes to a governance system for enforcement. Also, it should be noted that server 104 and server 106 may each represent a cluster of servers in one or more data centers. Alternatively, server 104 and server 106 may each represent multiple computing nodes in one or more cloud environments.

Client 110, client 112, and client 114 also connect to network 102. Clients 110, 112, and 114 are clients of server 104 and server 106. In this example, clients 110, 112, and 114 are shown as desktop or personal computers with wire communication links to network 102. However, it should be noted that clients 110, 112, and 114 are examples only and may represent other types of data processing systems, such as, for example, laptop computers, handheld computers, smart phones, smart televisions, and the like, with wire or wireless communication links to network 102. Users of clients 110, 112, and 114 may use clients 110, 112, and 114 to access and utilize the data security rule change impact analysis services provided by server 104 and server 106.

Storage 108 is a network storage device capable of storing any type of data in a structured format or an unstructured format. In addition, storage 108 may represent a plurality of network storage devices. Further, storage 108 may store identifiers and network addresses for a plurality of different client devices, a business glossary of terms, a catalog of information assets, a database of data protection rules, identifiers for a plurality of client device users, and the like. Furthermore, storage 108 may store other types of data, such as authentication or credential data that may include user names, passwords, and biometric data associated with client device users and system administrators, for example.

In addition, it should be noted that network data processing system 100 may include any number of additional servers, clients, storage devices, and other devices not shown. Program code located in network data processing system 100 may be stored on a computer readable storage medium and downloaded to a computer or other data processing device for use. For example, program code may be stored on a computer readable storage medium on server 104 and downloaded to client 110 over network 102 for use on client 110.

In the depicted example, network data processing system 100 may be implemented as a number of different types of communication networks, such as, for example, an internet, an intranet, a local area network (LAN), a wide area network (WAN), a telecommunications network, or any combination thereof. FIG. 1 is intended as an example only, and not as an architectural limitation for the different illustrative embodiments.

With reference now to FIG. 2, a diagram of a data processing system is depicted in accordance with an illustrative embodiment. Data processing system 200 is an example of a computer, such as server 104 in FIG. 1, in which computer readable program code or instructions implementing processes of illustrative embodiments may be located. In this example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis or a persistent basis. Further, a computer readable storage device excludes a propagation medium. Memory 206, in these examples, may be, for example, a random-access memory (RAM), or any other suitable volatile or non-volatile storage device, such as a flash memory. Persistent storage 208 may take various forms, depending on the particular implementation. For example, persistent storage 208 may contain one or more devices. For example, persistent storage 208 may be a disk drive, a solid-state drive, a rewritable optical disk, a rewritable magnetic tape, or some combination of the above. The media used by persistent storage 208 may be removable. For example, a removable hard drive may be used for persistent storage 208.

In this example, persistent storage 208 stores rule change impact analyzer 218. However, it should be noted that even though rule change impact analyzer 218 is illustrated as residing in persistent storage 208, in an alternative illustrative embodiment rule change impact analyzer 218 may be a separate component of data processing system 200. For example, rule change impact analyzer 218 may be a hardware component coupled to communication fabric 202 or a combination of hardware and software components. In another alternative illustrative embodiment, a first set of components of rule change impact analyzer 218 may be located in data processing system 200 and a second set of components of rule change impact analyzer 218 may be located in a second data processing system, such as, for example, server 106 in FIG. 1.

Rule change impact analyzer 218 predicts impact of data security rule changes on information asset access by users prior to commitment of the data security rule changes for enforcement using an enforcement knowledge graph. As a result, data processing system 200 operates as a special purpose computer system in which rule change impact analyzer in data processing system 200 enables analysis of rule change impact on information asset access. In particular, rule change impact analyzer 218 transforms data processing system 200 into a special purpose computer system as compared to currently available general computer systems that do not have rule change impact analyzer 218.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultrahigh frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, fifth-generation (5G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 220 is located in a functional form on computer readable media 222 that is selectively removable and may be loaded onto or transferred to data processing system 200 for running by processor unit 204. Program code 220 and computer readable media 222 form computer program product 224. In one example, computer readable media 222 may be computer readable storage media 226 or computer readable signal media 228. Computer readable storage media 226 may include, for example, an optical or magnetic disc that is inserted or placed into a drive or other device that is part of persistent storage 208 for transfer onto a storage device, such as a hard drive, that is part of persistent storage 208. Computer readable storage media 226 also may take the form of a persistent storage, such as a hard drive, a thumb drive, or a flash memory that is connected to data processing system 200. In some instances, computer readable storage media 226 may not be removable from data processing system 200.

Alternatively, program code 220 may be transferred to data processing system 200 using computer readable signal media 228. Computer readable signal media 228 may be, for example, a propagated data signal containing program code 220. For example, computer readable signal media 228 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 220 may be downloaded over a network to persistent storage 208 from another device or data processing system through computer readable signal media 228 for use within data processing system 200. For instance, program code stored in a computer readable storage media in a data processing system may be downloaded over a network from the data processing system to data processing system 200. The data processing system providing program code 220 may be a server computer, a client computer, or some other device capable of storing and transmitting program code 220.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 226 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

A chief data officer of an organization, such as, for example, a business, enterprise, agency, institution, or the like, may struggle with balancing accessibility of data sets by data scientists and other data consumers with data access compliance laws and organization data protection policies. One issue is how lenient or restrictive should the chief data officer be in defining rules for allowing access or limiting access to data of the organization. On one hand, the chief data officer needs to protect the data and, on the other hand, the chief data officer needs to make sure the organization is provided with appropriate analytics without overly limiting the access to the data.

Illustrative embodiments enable the chief data officer to see the impact of implementing one or more new data security or protection rules in a governance system prior to committing any changes to the data security rule space managed by the chief data officer. Illustrative embodiments allow the chief data officer to see if a rule change will be too restrictive on data access or too permissive, along with what the impact will be on user access. Illustrative embodiments provide insight into the impact of the chief data officer removing one or more rules from the governance system or making multiple rule changes and the overall cumulative impact before the chief data office commits the rule changes to the governance system for execution.

Current solutions perform simulations either by statistical or sampling methods or current solutions use full brute-force methods over the full Cartesian product of information assets, users, and rules, which is extremely expensive in the latter and insufficient in the former. None of the current solutions predict information asset access patterns. Hence, current solutions are computationally long and trade-off accuracy to meet performance requirements in any what-if analysis. Moreover, current solutions do not provide a differential analysis between governance system states before and after rule changes. In contrast, illustrative embodiments are closer to real-time performance with higher accuracy.

Illustrative embodiments provide insight regarding impact of simultaneously modifying one or more data security rules in the governance system by using information stored in an enforcement knowledge graph. The enforcement knowledge graph contains the current state of the information asset and user domains. Illustrative embodiments use the enforcement knowledge graph to decrease the computation cost associated with evaluating the impact of one or more rule changes in the governance system prior to the chief data officer committing the rule changes to the governance system as part of the organization's data protection policy obligation. The typical computation is O (A×U)~O (A×U×R), where "A" is information assets, "U" is users, and "R" is rules.

The enforcement knowledge graph provides probabilistic information asset access predictors over the general information asset space of the organization. The enforcement knowledge graph provides constraints to process the impact without having to go over the full Cartesian product. Illustrative embodiments achieve this by looking at all the changed rules, along with their predication blocks. These predication blocks contain vocabulary (i.e., terms) that allows illustrative embodiments to traverse the enforcement knowledge graph to identify information assets that contain terms that match the terms contained in the prediction blocks to produce a smaller set of information assets from the entire information asset space.

For example, illustrative embodiments shred or parse a new or modified rule to extract terms, which are part of the rule vocabulary, from the set of one or more predication blocks of the new or modified rule. For each term extracted from the rule shredding, illustrative embodiments traverse the enforcement knowledge graph to locate all information assets having the same or similar term. It should be noted that the enforcement knowledge graph captures the instantaneous closure of terms to rules, information assets, users, user context, enforcement decisions, and the like in a hypergraph. Once illustrative embodiments identify the smaller set of information assets that has matching terms with the new or modified rule, illustrative embodiments determine historic accesses by users to this smaller set of information assets from traversing hyperedges corresponding to this smaller set of information assets in the enforcement knowledge graph. As a result, illustrative embodiments have the historic user access results for this set of information assets based on the old rule space. In addition, illustrative embodiments run an evaluation of the new rule space alongside the old rule space to provide the impacted results. Combining the historic results with the impacted results provides a final differential analysis result.

Illustrative embodiments also perform a prediction analysis. In performing the prediction analysis phase of the impact analysis, illustrative embodiments assume that the enforcement knowledge graph is enriched with spatial relationships between information assets. One type of spatial relationship between information assets is term similarity. The enforcement knowledge graph models this term similarity as weighted edges. Another type of spatial relationship between information assets is a temporal locality in information asset access relationship.

In the case of the spatial relationship being term similarity, illustrative embodiments identify similar information assets to the previously identified smaller set of information assets by traversing edges from the previously identified smaller set of information asset that are tagged as similar in the enforcement knowledge graph. Illustrative embodiments also identify users who accessed these similar information assets as well. This identified set of users will not include any users who accessed the previously identified smaller set of information asset. During this prediction analysis phase, illustrative embodiments then identify a context of access for each of these predicted users using probabilistic or frequency measures, which are also contained in the enforcement knowledge graph. Illustrative embodiments then run an evaluation with this user context of access information over the old rule space and the new rule space. Illustrative embodiments then merge all results for rendering purposes to produce a differential analysis that depicts the change in the enforcement disposition over the information asset and user domains.

As a result, illustrative embodiments are capable of working with rule changes, such as, for example, adding, removing, and/or modifying rules in the current rule space and assessing overall rule change impact prior to rule commit. Thus, illustrative embodiments provide one or more technical solutions that overcome a technical problem with predicting rule change impact prior to committing the rule changes for enforcement. As a result, these one or more technical solutions provide a technical effect and practical application in the field of data security.

With reference now to FIG. 3, a diagram illustrating an example of a rule change impact analysis system is depicted in accordance with an illustrative embodiment. Rule change impact analysis system 300 may be implemented in a network of data processing systems, such as network data processing system 100 in FIG. 1. Rule change impact analysis system 300 is a system of hardware and software components for predicting an impact of one or more data security rule changes on information asset access by users prior to committing the data security rule changes to a governance system for enforcement using information contained in an enforcement knowledge graph.

In this example, rule change impact analysis system 300 includes rule change impact analysis server 302 and data lake 304. However, it should be noted that rule change impact analysis system 300 is intended as an example only. In other words, rule change impact analysis system 300 may include any number of rule change impact analysis servers, data lakes, and other devices not shown.

Rule change impact analysis server 302 may be, for example, server 104 in FIG. 1 or data processing system 200 in FIG. 2. Data lake 304 may be, for example, storage 108 in FIG. 1. Also, it should be noted that server 302 and data lake 304 are coupled together via a network, such as, for example, network 102 in FIG. 1.

Data lake 304 stores raw data for an organization as information assets 306. Data lake 304 stores information assets 306 in a structured or relational format. For example, information assets 306 may be one or more rectangular data sets. The rectangular data sets may include, for example, sets of tables, spreadsheets, and the like.

In this example, rule change impact analysis server 302 includes data profiler 308, business glossary 310, catalog 312, enforcement decision engine 314, rule database 316, continuous enforcement knowledge graph builder and maintainer 318, enforcement knowledge graph 320, base graph model 322, rule change impact analysis processor 324, and presentation component 326. Data profiler 308 profiles information assets 306 to generate column-assigned data classes using superficial or deep data extraction techniques. In other words, data profiler 308 performs semantic (i.e., term) analysis of data contained in information assets 306. Data profiler 308 utilizes business glossary 310 to perform the semantic analyze of the data contained in information assets 306. Business glossary 310 is, for example, a hierarchical arrangement of vocabulary or words (i.e., terms), which designate data semantics for columns and information assets as a whole, that are used by the organization corresponding to data lake 304. Data profiler 308 sends data semantics feed 328, which is the result of the semantic analysis, to continuous enforcement knowledge graph builder and maintainer 318. It should be noted that a user may also manually assign terms in data semantics feed 328.

Catalog 312 lists virtual information assets that reference one or more of information assets 306. Catalog 312 is a metadata repository storing all information asset instances structure. A virtual information asset is a stub structure that contains metadata regarding the real data set (i.e., the one or more of information assets 306) the virtual information asset points to. Catalog 312 triggers event messages to continuous enforcement knowledge graph builder and maintainer 318 on changes to catalog 312.

Enforcement decision engine 314 controls access to information assets 306 in data lake 304 using data protection rules stored in rule database 316. Data protection rules guide data access enforcement decisions to achieve intended results. Data protection rules may include, for example, organization rules, government rules, data security regulations, and the like, that govern who can access what data, when, and from where.

If an access enforcement decision is to allow access based on associated data protection rules, then enforcement decision engine 314 permits access to the requested information asset. If the access enforcement decision is to deny access based on the associated data protection rules, then enforcement decision engine 314 prevents access to requested information asset. If the access enforcement decision is to transform the requested information asset based on the associated data protection rules, then enforcement decision engine 314 utilizes information asset transformation component to transforms the requested information asset by, for example, redacting a portion of the information asset containing sensitive information. The sensitive data may be, for example, social security numbers, credit card numbers, driver license numbers, personal health information, dates of birth, or the like. Enforcement decision engine 314 and rule database 316 send enforcement decision feed and general rule feed 330 to continuous enforcement knowledge graph builder and maintainer 318.

Continuous enforcement knowledge graph builder and maintainer 318 initially builds enforcement knowledge graph 320 based on base graph model 322. Further, continuous enforcement knowledge graph builder and maintainer 318 continuously maintains enforcement knowledge graph 320 by generates nodes and edges in enforcement knowledge graph 320 based on data semantics feed 328 and enforcement decision and general rule feed 330. Enforcement knowledge graph 320 is a hypergraph, such as, for example, enforcement knowledge graph 600 in FIG. 6, that contains domain knowledge of the organization for access enforcement decisions. In other words, enforcement knowledge graph 320 is a graph-organized information store where elements are modeled as nodes and edges. Nodes may include, for example, information asset nodes, column nodes, user nodes, term nodes, policy nodes, rule nodes, enforcement decision nodes, data class nodes, and the like. Edges represent relationships between nodes. For example, an edge tagged as similar connecting two information asset nodes indicates that the information assets represented by those connected nodes contain same or similar terms. In addition, edges may include hyperedges that connect three or more nodes in a relationship.

A client device user, such as, for example, a chief data officer of the organization corresponding to data lake 304, sends one or more rule changes, such as, for example, adding one or more new data protection rules, deleting one or more data protection rules, modifying one or more data protection rules, or any combination thereof, to rule change impact analysis server 302 for determining the impact of the rule changes on information asset access prior to committing the rule changes for enforcement by enforcement decision engine 314. Rule change impact analysis server 302 utilizes rule change impact analysis processor 324 to perform the impact analysis.

In this example, rule change impact analysis processor 324 includes rule set differential 332, rule set differential analyzer 334, and predictive analyzer 336. Rule set differential 332 represents a difference between the received rule changes and an old rule space (i.e., the current rules in rule database 316). The difference between the received rule changes and the old rule space represents the new rule space to be analyzed. Rule set differential analyzer 334 performs a differential analysis between historic information asset accesses based on the old rule set and predicted information asset accesses based on the new rule set to generate the rule change impact result. Rule set differential analyzer 334 utilizes presentation component 326 to render and display the rule change impact result to the client device user. Presentation component 326 may render and display the rule change impact result as, for example, a polar plot, such as polar plot 700 in FIG. 7. Predictive analyzer 336 performs a prediction analysis to determine likelihood of users accessing information assets based on the new rule set and context of previous information asset accesses by the users. As a result, the client device user has insight as to how the rule changes will impact information asset access by users prior to committing the rule changes to enforcement decision engine 314 for enforcement.

Figure 4:
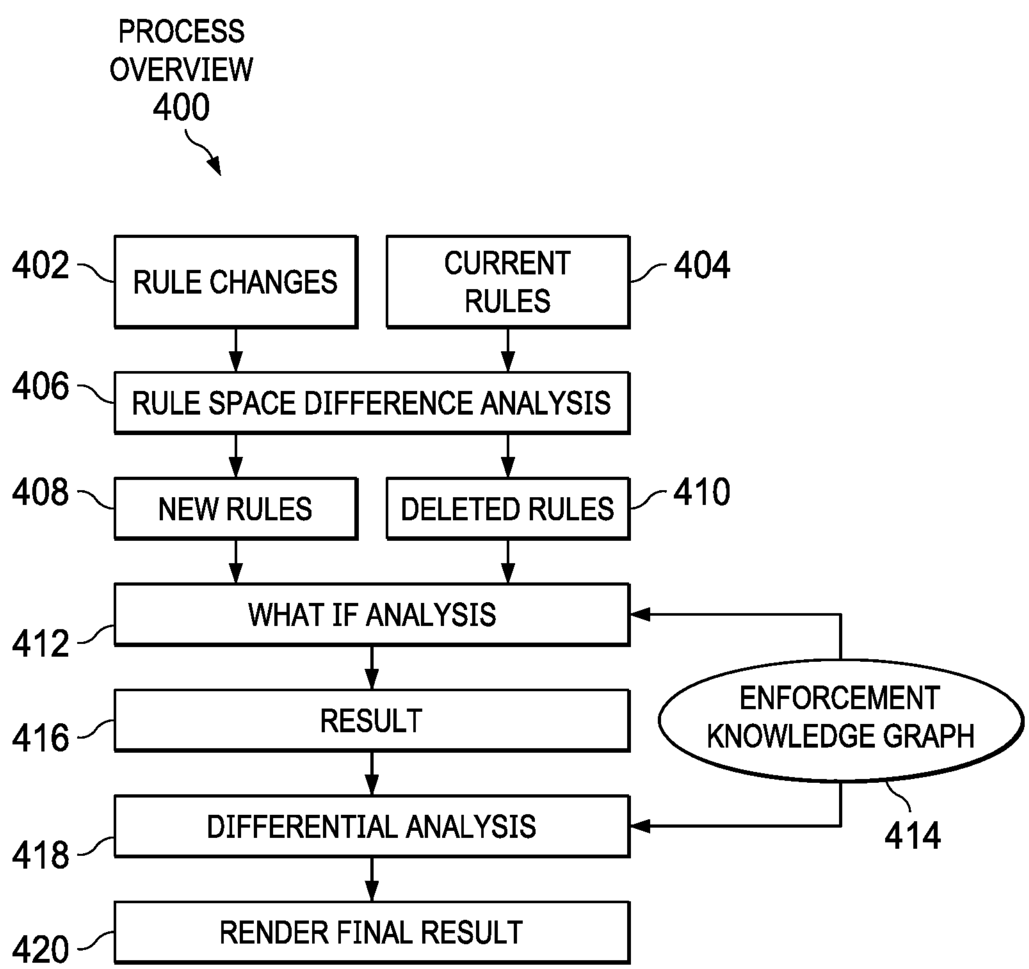
FIG. 4 is a diagram illustrating a process overview example in accordance with an illustrative embodiment.

With reference now to FIG. 4, a diagram illustrating a process overview example is depicted in accordance with an illustrative embodiment. Process overview 400 may be implemented in a computer, such as, for example, server 104 in FIG. 1, data processing system 200 in FIG. 2, or rule change impact analysis server 302 in FIG. 3.

Process overview 400 starts when rule changes 402 are received from a client device corresponding to a user, such as, for example, a chief data officer. Rule changes 402 represent one or more rule changes, such as additions, deletions, modifications, and the like, to current rules 404 (i.e., old rule space). Rule space difference analysis 406 determines the difference between rule changes 402 and current rules 404 to generate new rules 408 and deleted rules 410 (i.e., the new rule space).

What if analysis 412 uses the information contained in enforcement knowledge graph 414 to predict a likelihood of users accessing information assets based on new rules 408 and context of previous information asset accesses by the users. What if analysis 412 passes what if analysis result 416 to differential analysis 418. Differential analysis 418 also utilizes the information contained in enforcement knowledge graph 414 to determine historic information asset accesses based on the old rule space (i.e., current rules 404). Differential analysis 418 then compares what if analysis result 416, which is based on the new rule space (i.e., new rules 408 and deleted rules 410), with the historic information asset accesses based on the old rule space to generate a rule change impact result. Render final result 420 represents a display of the rule change impact result on the client device corresponding to the user.

Figure 5:
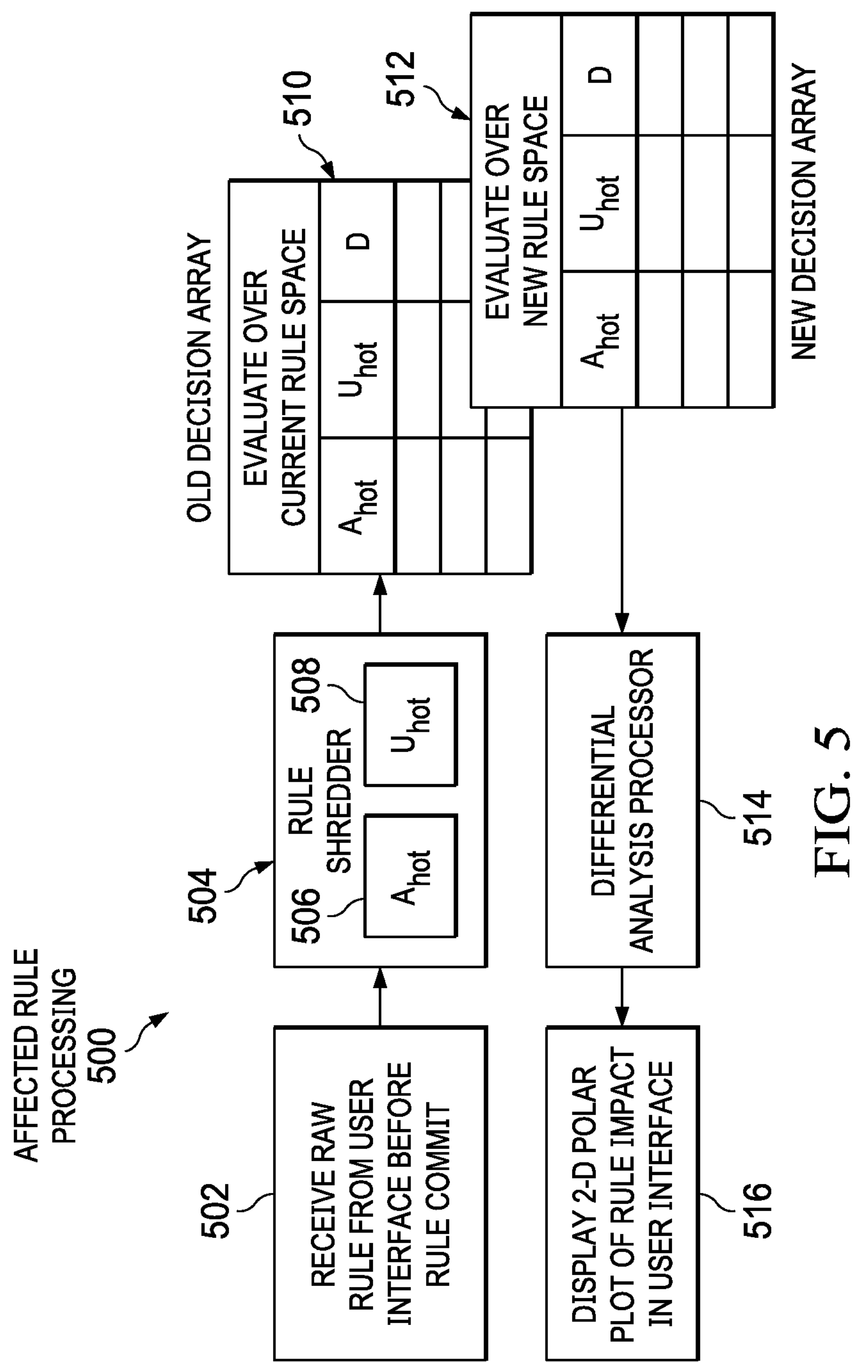
FIG. 5 is a diagram illustrating an example of affected rule processing in accordance with an illustrative embodiment.

With reference now to FIG. 5, a diagram illustrating an example of affected rule processing is depicted in accordance with an illustrative embodiment. Affected rule processing 500 may be implemented in a computer, such as, for example, server 104 in FIG. 1, data processing system 200 in FIG. 2, or rule change impact analysis server 302 in FIG. 3.

Affected rule processing 500 starts at 502 when a raw rule is received from a user interface before rule commit. Affected rule processing 500 utilizes rule shredder 504 to parse a structure of the raw rule to extract terms. An example of a rule structure is as follows: IF <Predication Block> THEN <Action Block>. The action block may be, for example, one of allow, deny, or transform. A transform action is to transform an information asset. For example, a transform action may be, for example, hiding an information asset, partial redaction of an information asset, masking an information asset, modifying an information asset, encoding an information asset, preserving data format, preserving data distribution, or the like. The predication block may be, for example, a generalized Boolean expression, a fully-bracketed expression, a partially-bracketed expression, or the like. A specific example of a rule is: IF <asset.tag is "foo"> AND <User.name is "John"> THEN <transform sensitive personal information>. In this specific example, the rule contains two predication blocks (i.e., <asset.tag is "foo"> AND <user.name is "John">) and one action block (i.e., <transform sensitive personal information>). Each prediction block of the rule contains a left-hand side and a right-hand side. In this specific example, the left-hand side of the prediction blocks is "asset.tag" and "user.name" and the right-hand side is "foo" and "John". All hot information assets (i.e., "Ana" 506) have terms that match the right-hand side terms (i.e., "foo" and "John") and all hot users (i.e., "$U_{hot}$" 508) have previously accessed the hot information assets.

At 510, affected rule processing 500 evaluates over the current (i.e., old) rule space to generate an old (i.e., historic) enforcement decision array. At 512, affected rule processing 500 evaluates over the new rule space to generate a new (i.e., predicted) enforcement decision array. It should be noted that the new rule space equals the current rule space and affected rules. Differential analysis processor 514 compares the old enforcement decision array with the new enforcement decision array to generate a rule change impact result. At 516, affected rule processing 500 displays a two-dimensional polar plot of the rule change impact in the user interface.

Figure 6:
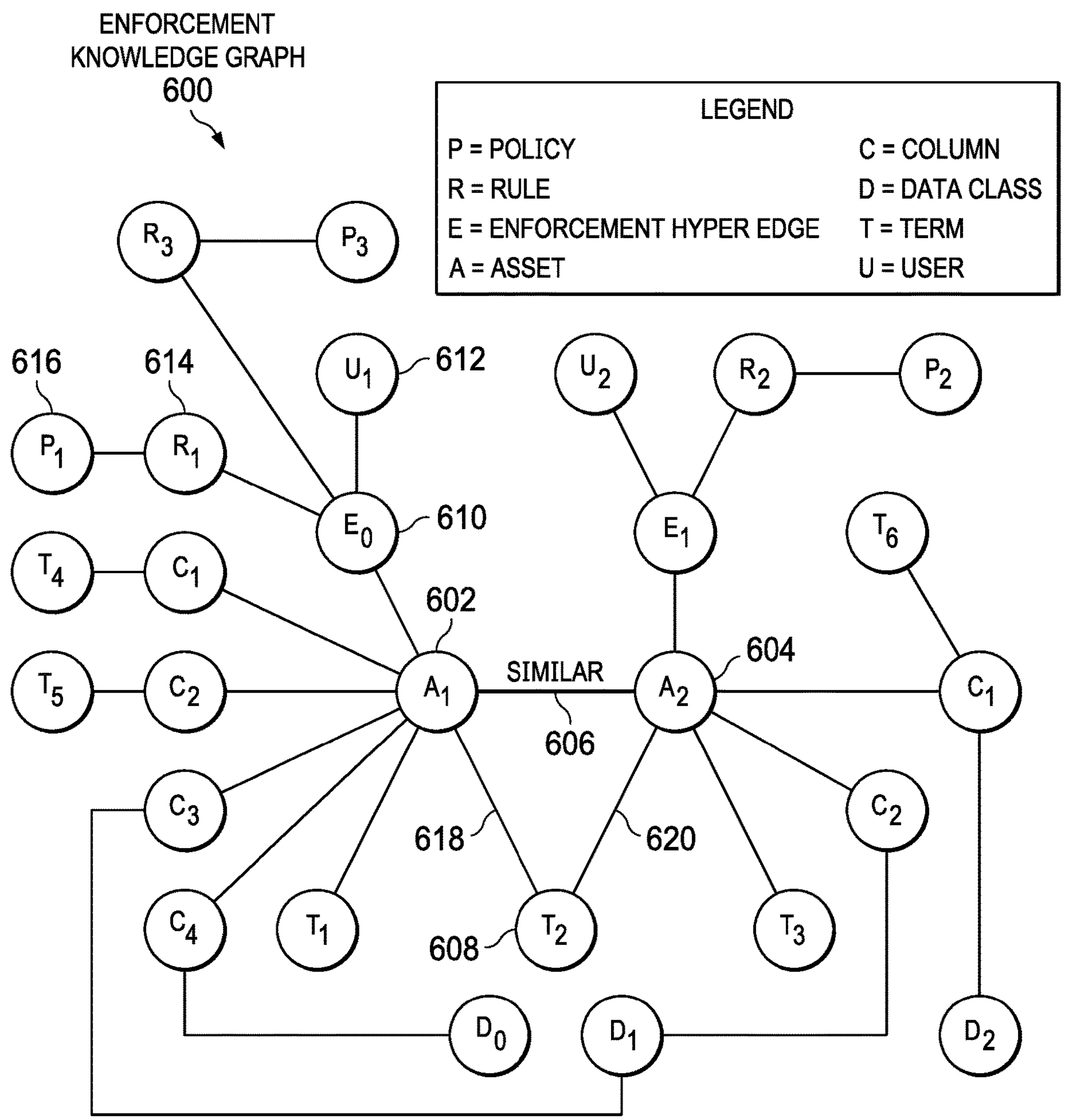
FIG. 6 is a diagram illustrating an example of an enforcement knowledge graph in accordance with an illustrative embodiment.

With reference now to FIG. 6, a diagram illustrating an example of an enforcement knowledge graph is depicted in accordance with an illustrative embodiment. Enforcement knowledge graph 600 may implemented in a computer, such as, for example, server 104 in FIG. 1, data processing system 200 in FIG. 2, or rule change impact analysis server 302 in FIG. 3. In addition, enforcement knowledge graph 600 may be generated and continuously updated by a continuous enforcement knowledge graph builder and maintainer component, such as, for example, continuous enforcement knowledge graph builder and maintainer 318 in FIG. 3.

Enforcement knowledge graph 600 contains historic enforcement decision knowledge regarding accesses to information assets, such as, for example, information assets 306 in FIG. 3. For example, enforcement knowledge graph 600 shows how access enforcement decision node "$E_0$" 610 relates to information asset node "$A_1$" 602 that references a particular information asset, user node "$U_1$" 612 that references the user who submitted the request to access that particular information asset, rule node "$R_1$" 614 that references the rule associated with accessing that particular information asset, and policy node "Pi" 616 that reference the policy that contains the rule referenced by rule node "$R_1$" 614.

Further, enforcement knowledge graph 400 shows how information asset node "$A_1$" 602 relates to information asset node "$A_2$" 604. In this example, edge 606, which is tagged "similar", connects information asset node "$A_1$" 602 to information asset node "$A_2$" 604. Edge 606 indicates that the information asset referenced by information asset node "$A_1$" 602 is similar to the information asset referenced by information asset node "$A_2$" 604. For example, both information asset node "$A_1$" 602 and information asset node "$A_2$" 604 connect to term node "$T_2$" 608 via edges 618 and 620, respectively. Term node "$T_2$" 608 references a term that is common to the information assets referenced by information asset node "$A_1$" 602 and information asset node "$A_2$" 604.

Figure 7:
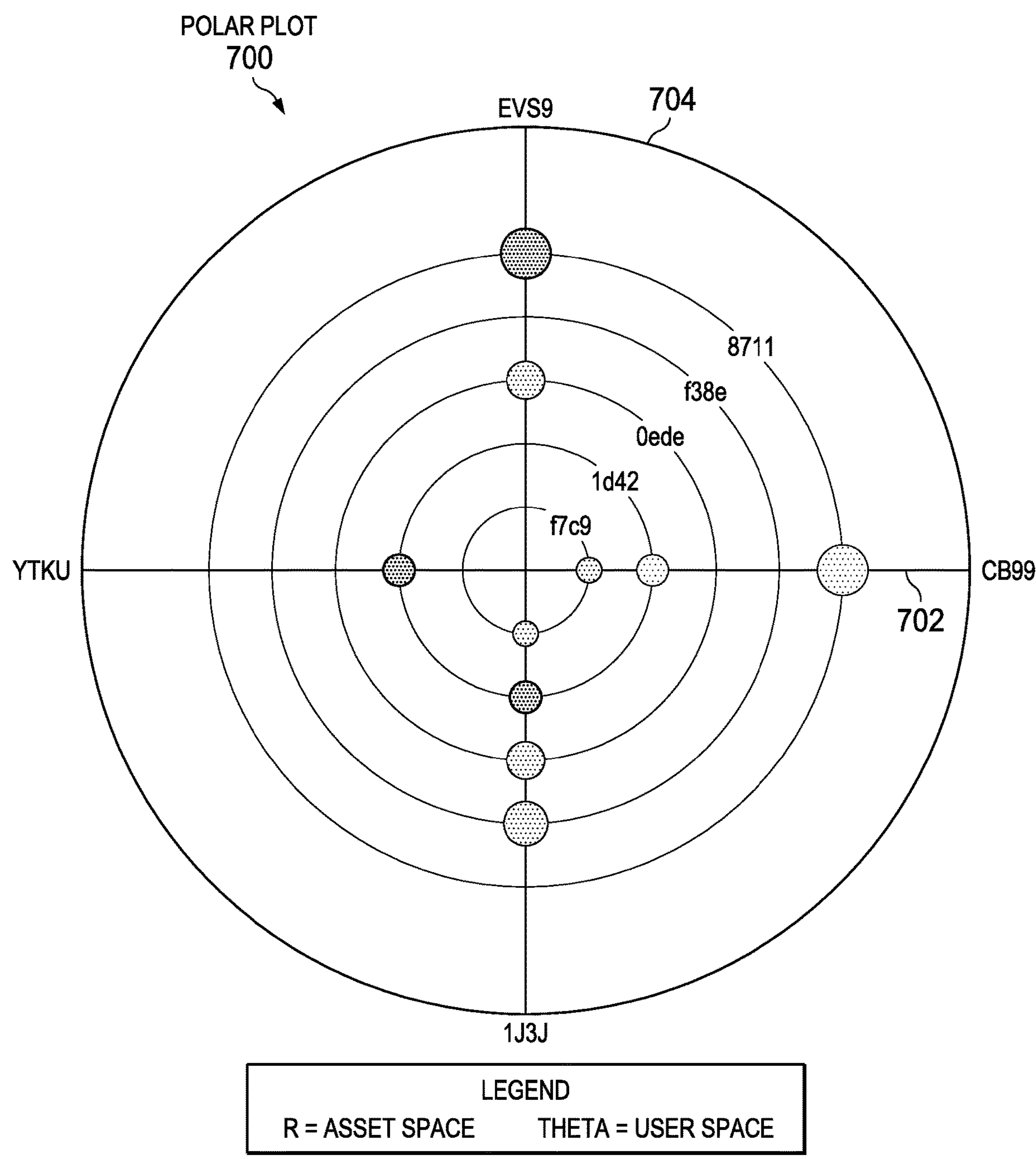
FIG. 7 is a diagram illustrating an example of a polar plot in accordance with an illustrative embodiment.

With reference now to FIG. 7, a diagram illustrating an example of a polar plot is depicted in accordance with an illustrative embodiment. Polar plot 700 may generated by a computer, such as, for example, server 104 in FIG. 1, data processing system 200 in FIG. 2, or rule change impact analysis server 302 in FIG. 3.

In this example, polar plot 700 is a two-dimensional polar plot that includes information asset space 702 along the radial lines and user space 704 along the arches between the radial lines. The arrangement of the information assets in the radial dimension is such that the information assets are ordered by most important (e.g., most popular) information assets toward the center of polar plot 700. It should be noted that polar plot 700 may be color-coded and radially-scaled. Radially-scaled means that more important information assets or most recently accessed (e.g., most recently used) information assets are located toward the center of polar plot 700. In contrast, less popular assets are located farther away from the center of polar plot 700. Polar plot 700 may provide enforcement decision disposition over the old rule space, enforcement decision disposition over the new rule space, differential analysis result disposition between the new and old rule space, and an aggregational view over a non-disjoint information asset space.

The radial representation of information assets (i.e., concentric circles) are ordered with the most popular information assets toward the center of polar plot 700 and increasing linearly outward with a high density of concentric rings (i.e., information assets toward the center) representing the most popular assets and getting sparser in the "r" dimension outwards. The function is to first order the information assets by popularity/frequency or access date. Then, select the information assets in order and assign a selected information asset a radial distance given by the function $r(A[i])=i+(i-1)^2/K$, where "i" is the index of the selected information asset in the list. As "i" increases, the distance from the center of its concentric circle increases slightly, which is determined by scale factor "K" and other factors, such as rendering size and the like. The hottest information asset is the innermost concentric circle spreading out from there more sparsely.

Figure 8:
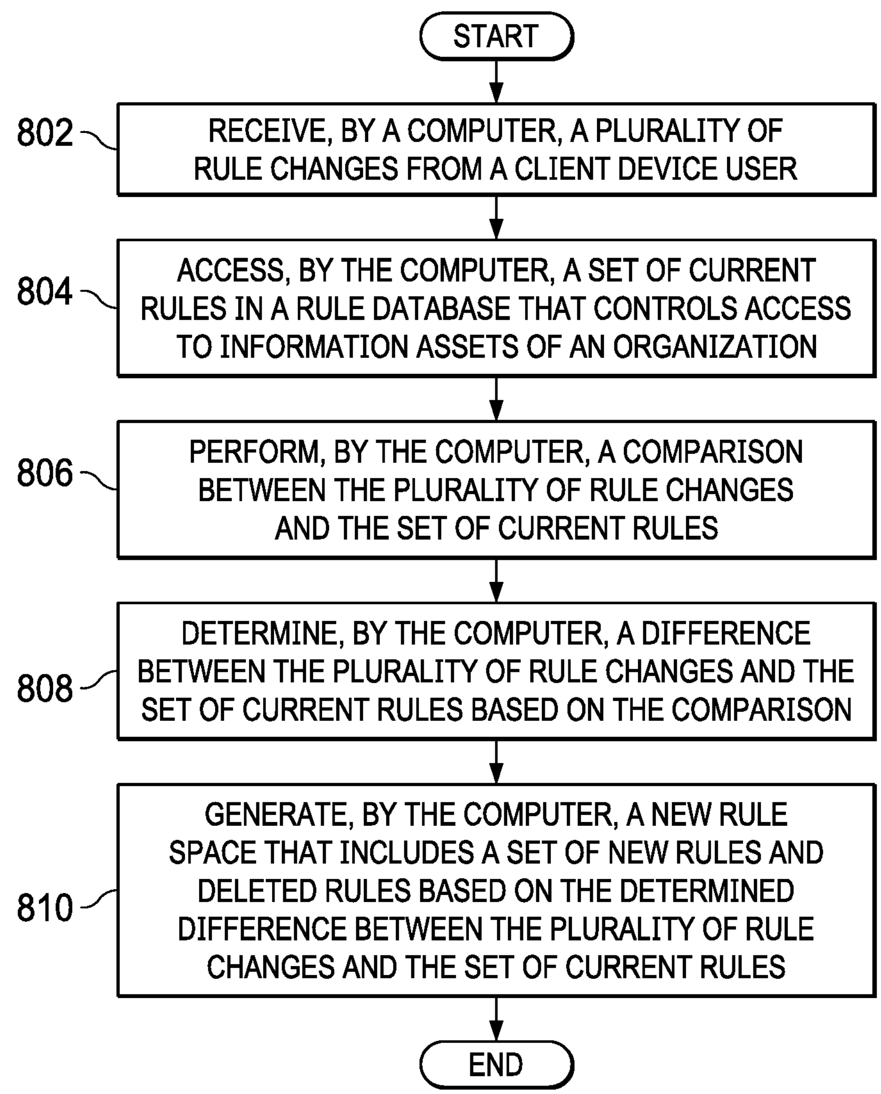
FIG. 8 is a flowchart illustrating a process for generating a new rule space in accordance with an illustrative embodiment.

With reference now to FIG. 8, a flowchart illustrating a process for generating a new rule space is shown in accordance with an illustrative embodiment. The process shown in FIG. 8 may be implemented in a computer, such as, for example, server 104 in FIG. 1, data processing system 200 in FIG. 2, or rule change impact analysis server 302 in FIG. 3.

The process begins when the computer receives a plurality of rule changes from a client device user (step 802). The computer accesses a set of current rules in a rule database that controls access to information assets of an organization (step 804). The computer performs a comparison between the plurality of rule changes and the set of current rules (step 806).

The computer determines a difference between the plurality of rule changes and the set of current rules based on the comparison (step 808). The computer generates a new rule space that incorporates new rules, and/or deleted existing rules, and/or modified existing rules based on the determined difference between the plurality of rule changes and the set of current rules (step 810). The computer generates a list of a set of one or more affected rules in the new rule space (step 812). Thereafter, the process terminates.

Figure 9A:
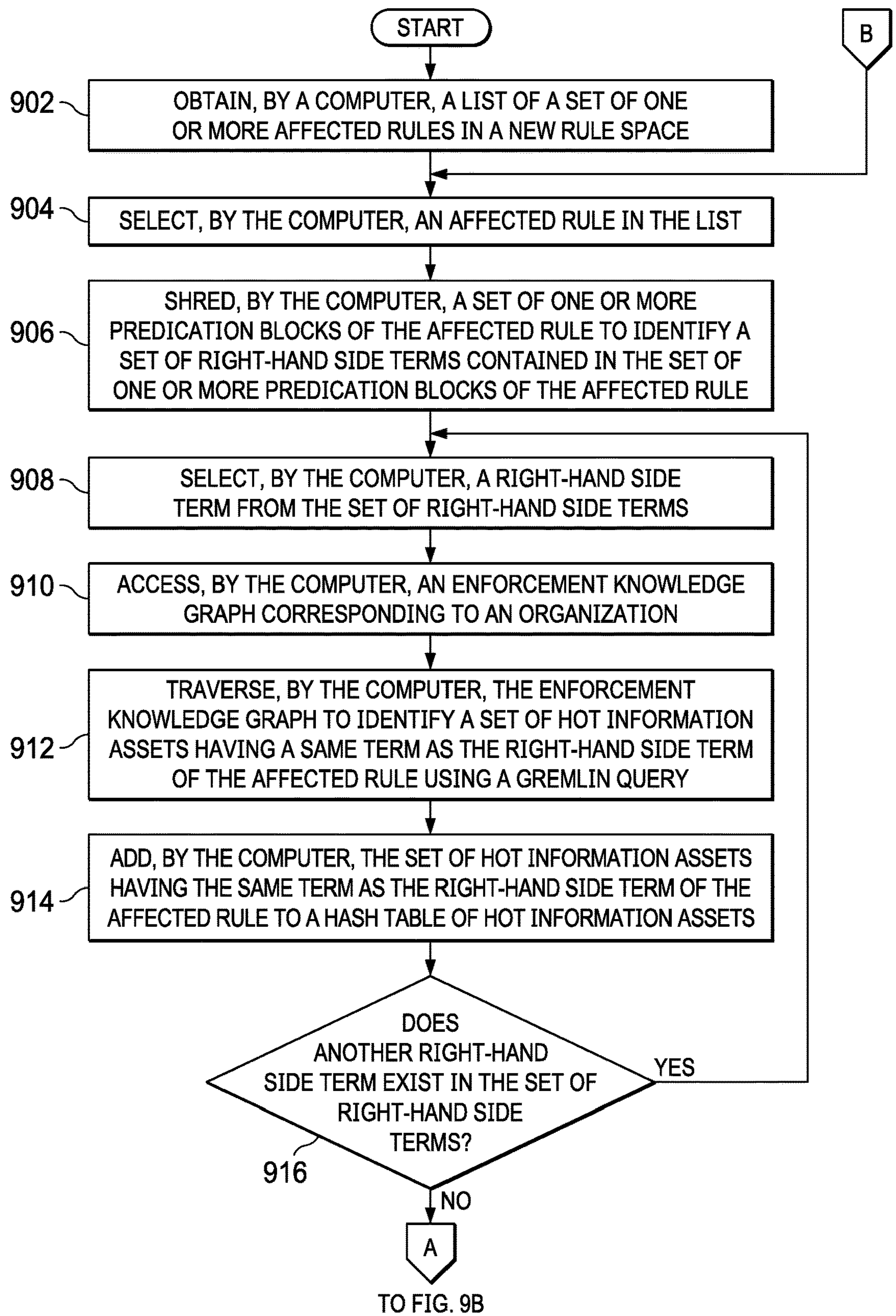
FIGS. 9A-9B are a flowchart illustrating a process for identifying information assets and users corresponding to a new rule space in accordance with an illustrative embodiment.
Figure 9B:
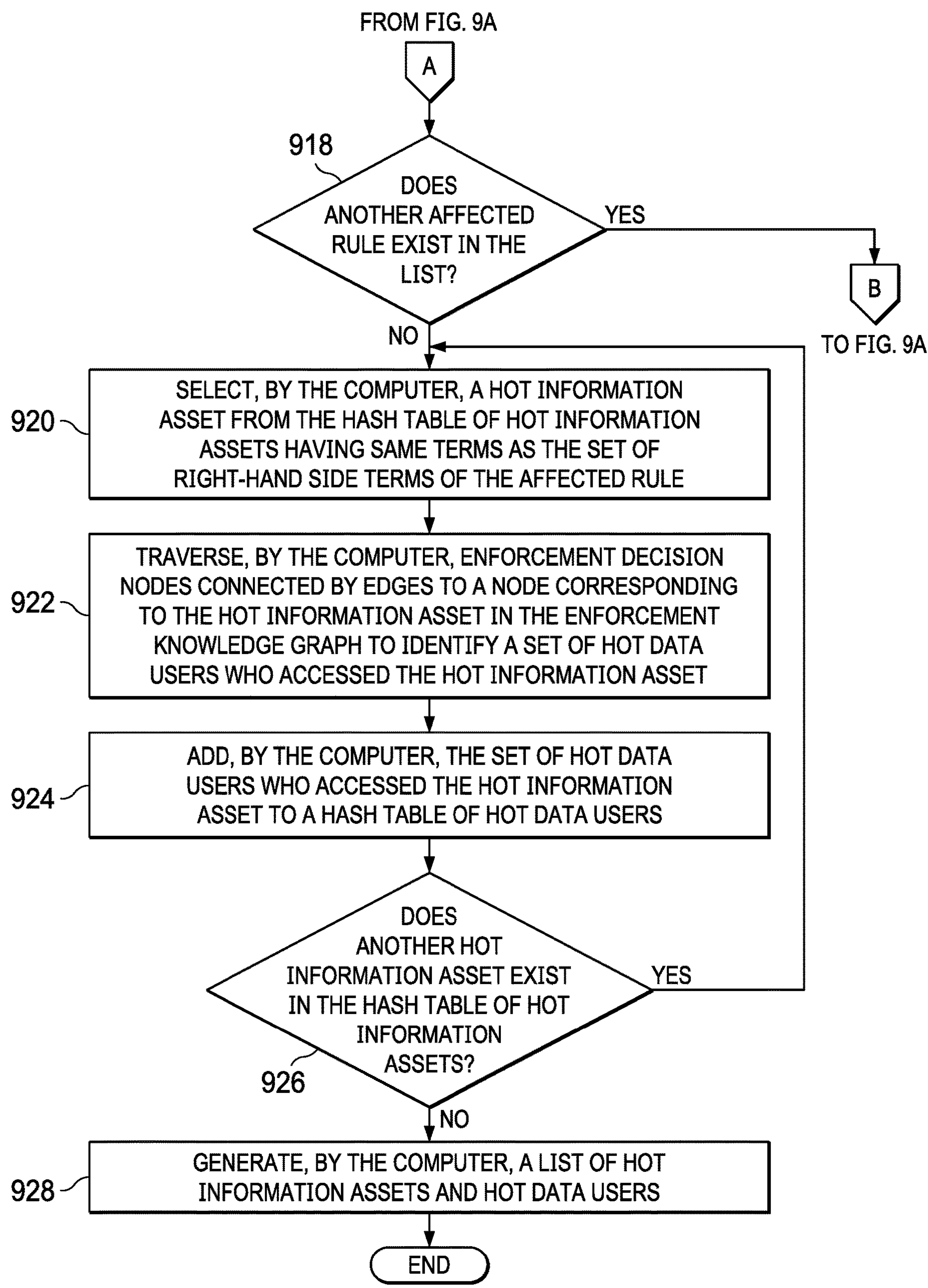

With reference now to FIGS. 9A-9B, a flowchart illustrating a process for identifying information assets and data users corresponding to a new rule space is shown in accordance with an illustrative embodiment. The process shown in FIGS. 9A-9B may be implemented in a computer, such as, for example, server 104 in FIG. 1, data processing system 200 in FIG. 2, or rule change impact analysis server 302 in FIG. 3.

The process begins when the computer obtains a list of a set of one or more affected rules in a new rule space (step 902). The computer selects an affected rule in the list (step 904). The computer shreds a set of one or more predication blocks of the affected rule to identify a set of right-hand side terms contained in the set of one or more predication blocks of the affected rule (step 906).

The computer selects a right-hand side term from the set of right-hand side terms of the affected rule (step 908). The computer accesses an enforcement knowledge graph corresponding to the organization (step 910). The computer traverses the enforcement knowledge graph to identify a set of hot information assets having a same term as the right-hand side term of the affected rule using a gremlin query (step 912). The computer adds the set of hot information assets having the same term as the right-hand side term of the affected rule to a hash table of hot information assets (step 914).

The computer makes a determination as to whether another right-hand side term exists in the set of right-hand side terms (step 916). If the computer determines that another right-hand side term does exist in the set of right-hand side terms, yes output of step 916, then the process returns to step 908 where the computer selects another right-hand side term in the set of right-hand side terms. If the computer determines that another right-hand side term does not exist in the set of right-hand side terms, no output of step 916, then the computer makes a determination as to whether another affected rule exists in the list (step 918).

If the computer determines that another affected rule does exist in the list, yes output of step 918, then the process returns to step 904 where the computer selects another affected rule in the list. If the computer determines that another affected rule does not exist in the list, no output of step 918, then the computer selects a hot information asset from the hash table of hot information assets having same terms as the set of right-hand side terms of the affected rule (step 920). The computer traverses enforcement decision nodes connected by edges to a node corresponding to the hot information asset in the enforcement knowledge graph to identify a set of hot data users who accessed the hot information asset (step 922). The computer adds the set of hot data users who accessed the hot information asset to a hash table of hot data users (step 924).

The computer makes a determination as to whether another hot information asset exists in the hash table of hot information assets (step 926). If the computer determines that another hot information asset does exist in the hash table of hot information assets, yes output of step 926, then the process returns to step 920 where the computer selects another hot information asset in the hash table of hot information assets. If the computer determines that another hot information asset does not exist in the hash table of hot information assets, no output of step 926, then the computer generates a list of hot information users and hot data users (step 928). Thereafter, the process terminates.

Figure 10A:
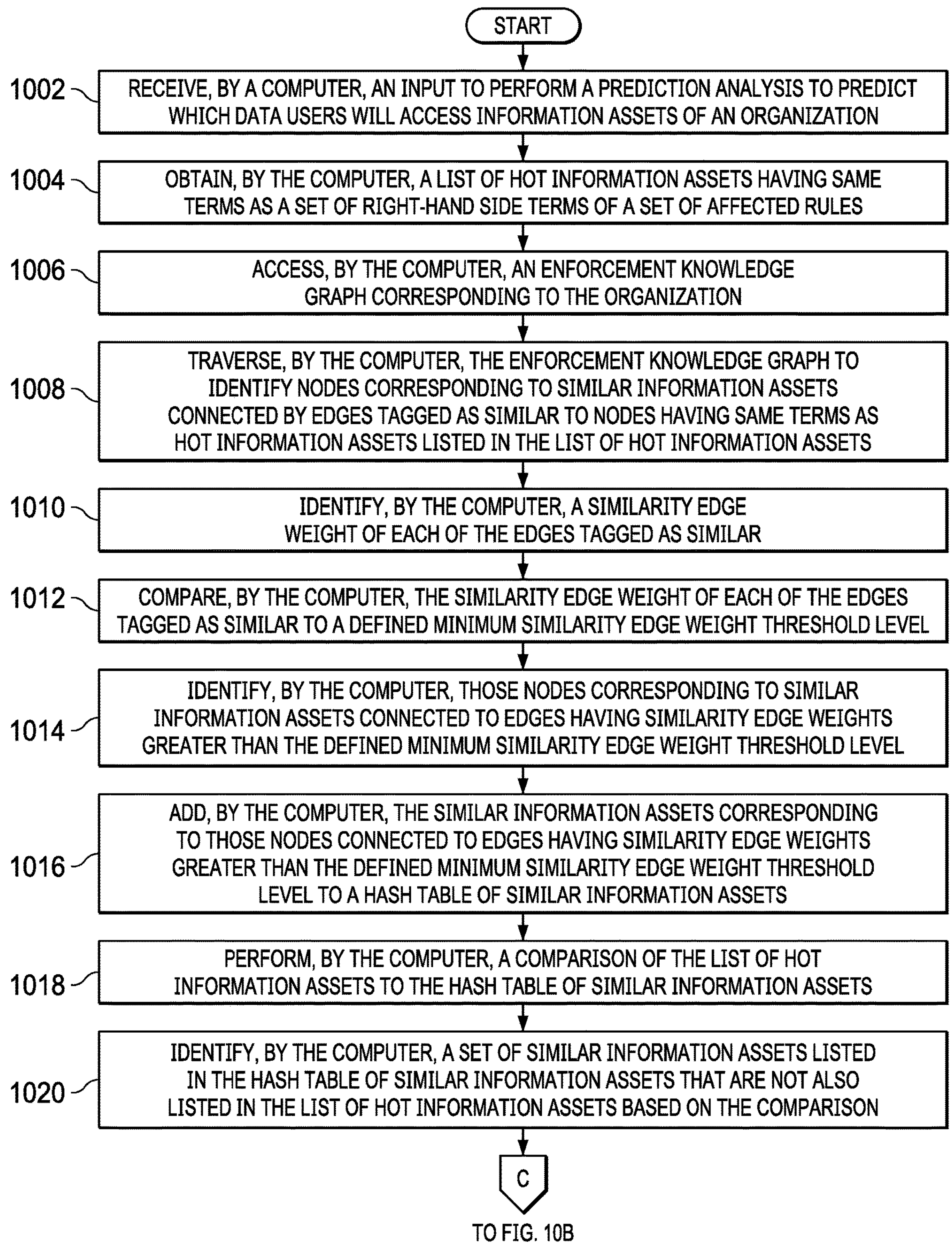
FIGS. 10A-10B are a flowchart illustrating a process for performing a prediction analysis in accordance with an illustrative embodiment.
Figure 10B:
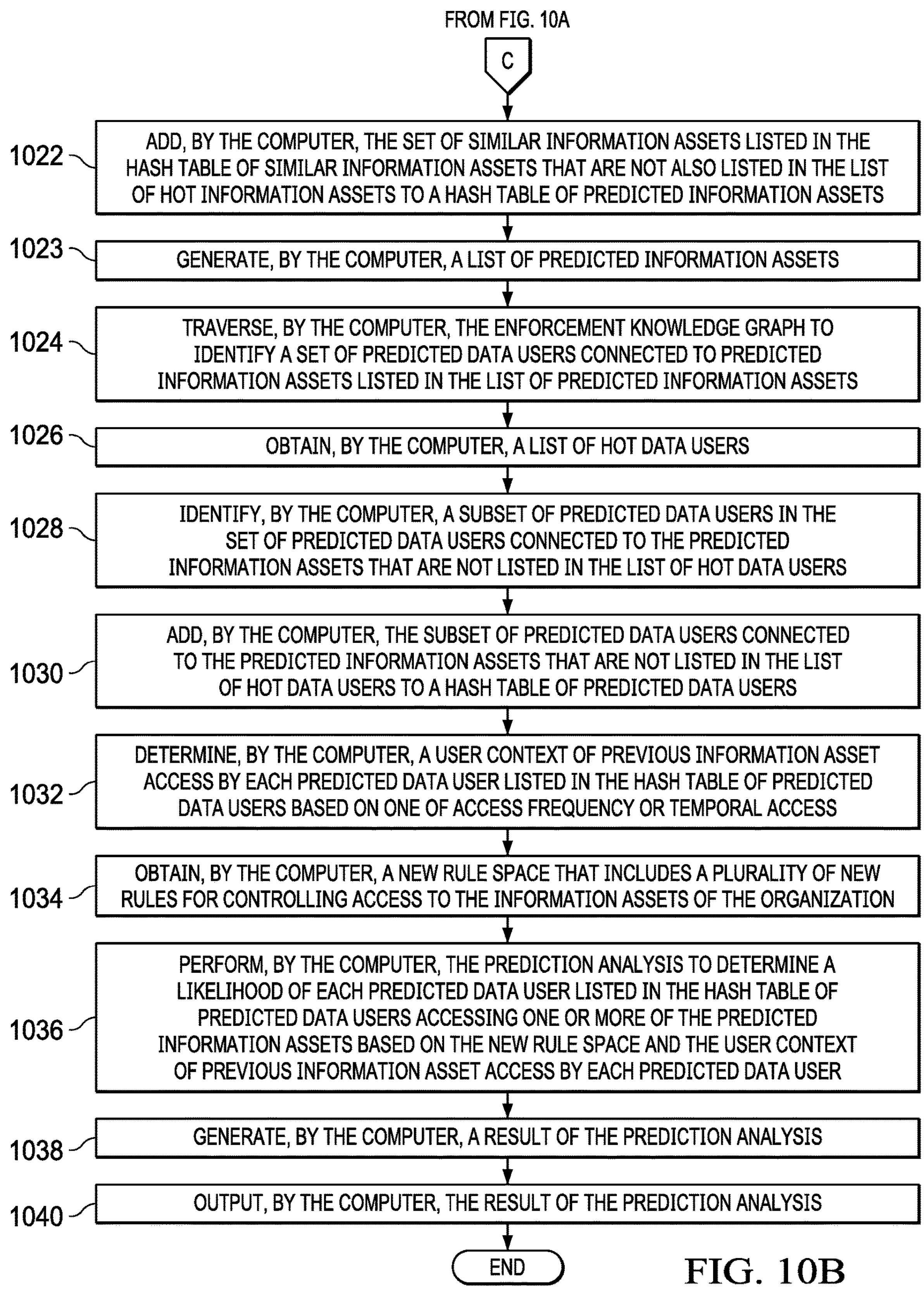

With reference now to FIGS. 10A-10B, a flowchart illustrating a process for performing a prediction analysis is shown in accordance with an illustrative embodiment. The process shown in FIGS. 10A-10B may be implemented in a computer, such as, for example, server 104 in FIG. 1, data processing system 200 in FIG. 2, or rule change impact analysis server 302 in FIG. 3.

The process begins when the computer receives an input to perform a prediction analysis to predict which data users will access information assets of an organization (step 1002). The computer obtains a list of hot information assets having same terms as a set of right-hand side terms of a set of affected rules in a new rule space (step 1004).

The computer accesses an enforcement knowledge graph corresponding to the organization (step 1006). The computer traverses the enforcement knowledge graph to identify nodes corresponding to similar information assets connected by edges tagged as similar to nodes having same terms as hot information assets listed in the list of hot information assets (step 1008). It should be noted that the computer utilizes a similarity establishing component to establish similarity between information assets based on superficial and/or deep data extraction techniques. The computer identifies a similarity edge weight of each of the edges tagged as similar (step 1010). The computer compares the similarity edge weight of each of the edges tagged as similar to a defined minimum similarity edge weight threshold level (step 1012).

The computer identifies those nodes corresponding to similar information assets connected to edges having similarity edge weights greater than the defined minimum similarity edge weight threshold level (step 1014). The computer adds the similar information assets corresponding to those nodes connected to edges having similarity edge weights greater than the defined minimum similarity edge weight threshold level to a hash table of similar information assets (step 1016).

The computer performs a comparison of the list of hot information assets to the hash table of similar information assets (step 1018). The computer identifies a set of similar information assets listed in the hash table of similar information assets that are not also listed in the list of hot information assets based on the comparison (step 1020). The computer adds the set of similar information assets listed in the hash table of similar information assets that are not also listed in the list of hot information assets to a hash table of predicted information assets (step 1022). The computer generates a list of predicted information assets (step 1023).

The computer traverses the enforcement knowledge graph to identify a set of predicted data users connected to predicted information assets listed in the list of predicted information assets (step 1024). The computer obtains a list of hot data users (step 1026). The computer identifies a subset of predicted data users in the set of predicted data users connected to the predicted information assets that are not listed in the list of hot data users (step 1028). The computer adds the subset of predicted data users connected to the predicted information assets that are not listed in the list of hot data users to a hash table of predicted data users (step 1030).

The computer determines a user context of previous information asset access by each predicted data user listed in the hash table of predicted data users based on one of access frequency or temporal access (step 1032). The computer obtains a new rule space that includes a plurality of new rules for controlling access to the information assets of the organization (step 1034). The computer performs the prediction analysis to determine a likelihood of each predicted data user listed in the hash table of predicted data users accessing one or more of the predicted information assets based on the new rule space and the user context of previous information asset access by each predicted data user (step 1036).

The computer generates a result of the prediction analysis (step 1038). The computer outputs the result of the prediction analysis (step 1040). Thereafter, the process terminates.

Figure 11:
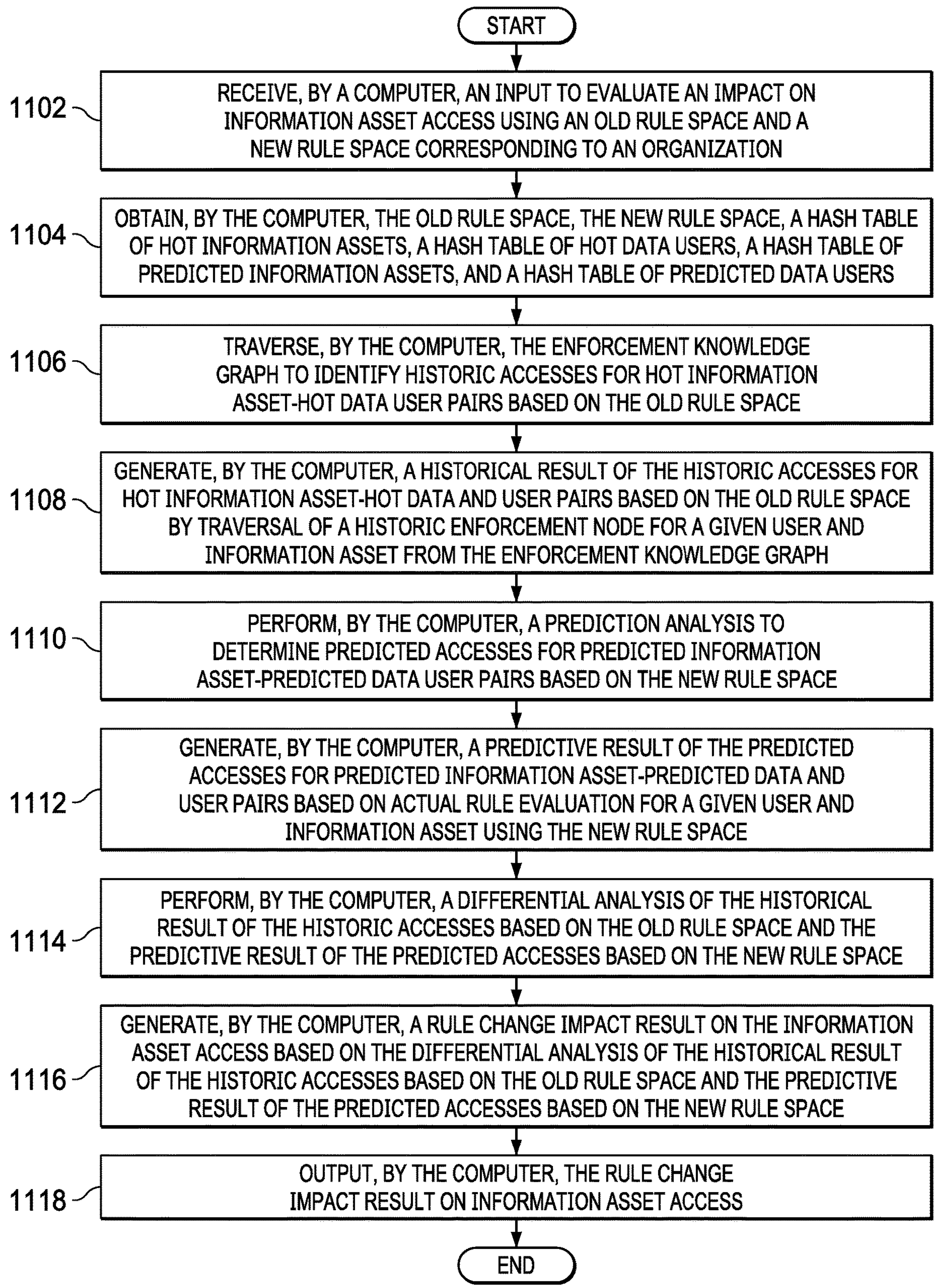
FIG. 11 is a flowchart illustrating a process for performing a differential analysis in accordance with an illustrative embodiment.

With reference now to FIG. 11, a flowchart illustrating a process for performing a differential analysis is shown in accordance with an illustrative embodiment. The process shown in FIG. 11 may be implemented in a computer, such as, for example, server 104 in FIG. 1, data processing system 200 in FIG. 2, or rule change impact analysis server 302 in FIG. 3.

The process begins when the computer receives an input to evaluate an impact on information asset access using an old rule space and a new rule space corresponding to an organization (step 1102). The computer obtains the old rule space, the new rule space, a hash table of hot information assets, a hash table of hot data users, a hash table of predicted information assets, and a hash table of predicted data users (step 1104).

The computer traverses the enforcement knowledge graph to identify historic accesses for hot information asset-hot data user pairs based on the old rule space (step 1106). The computer generates a historical result of the historic accesses for hot information asset-hot data and user pairs based on the old rule space by traversal of a historic enforcement node for a given user and information asset from the enforcement knowledge graph (step 1108). It should be noted that step 1108 is iterative over all hot information asset-hot data and user pairs and each iteration produces a singleton piece of result that is appended to the set of results.

The computer performs a prediction analysis to determine predicted accesses for predicted information asset-predicted data user pairs based on the new rule space (step 1110). The computer generates a predictive result of the predicted accesses for predicted information asset-predicted data and user pairs based on actual rule evaluation for a given user and information asset using the new rule space (step 1112). It should be noted that step 1112 is iterative over the predicted information asset-predicted data and user pairs and each iteration produces a singleton piece of result that is appended to the set of results.

The computer performs a differential analysis of the historical result of the historic accesses based on the old rule space and the predictive result of the predicted accesses based on the new rule space (step 1114). The computer generates a rule change impact result on the information asset access based on the differential analysis of the historical result of the historic accesses based on the old rule space and the predictive result of the predicted accesses based on the new rule space (step 1116). The computer outputs the rule change impact result on information asset access (step 1118). Thereafter, the process terminates.

The computer may output the rule impact result as a polar plot, for example. Resultant data of the rule change impact result fundamentally represents four independent pieces of information contained in a result set generated at step 1116 and the computer can combine the four independent pieces of information to present differential analysis by super position and color coding of overlaid polar plot points or coordinates representing information assets and users depending on user-requested differential analysis request. The four independent pieces of information consist of access decisions with historic users and information assets in the old rule space, access decisions with historic users and information assets in the new rule space, access decisions with predicted users and information assets in the old rule space, and access decisions with predicted users and information assets in the new rule space. In addition, the computer can provide super position of the access decisions with historic users and information assets in the old and new rule spaces for differential analysis of the rule change and super position of the access decisions with predicted users and information assets in the old and new rule spaces for differential analysis rendering with appropriate color coding.

Thus, illustrative embodiments of the present invention provide a computer-implemented method, computer system, and computer program product for predicting an impact of data security rule changes on information asset access by users prior to committing the data security rule changes using an enforcement knowledge graph. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for predicting access impact of a plurality of rule changes on a corpus of information assets, the computer-implemented method comprising:

receiving, by a computer, a set of affected rules in a new rule space for controlling access to the corpus of information assets;

shredding, by the computer, the set of affected rules to identify right-hand side terms contained in predication blocks of the set of affected rules;

traversing, by the computer, an enforcement knowledge graph to identify a set of hot information assets having same terms as the right-hand side terms of the set of affected rules, wherein the enforcement knowledge graph comprises a hypergraph that contains a current state of information assets and user domains and provides probabilistic information asset access predictors over a general information asset space of the organization, and wherein the set of hot information assets comprises information assets within the corpus of information assets with a high rate of historic access by users as compared to historic access by users of other information assets within the corpus of information assets; and adding, by the computer, the set of hot information assets having the same terms as the right-hand side terms of the set of affected rules to a hash table of hot information assets.

2. The computer-implemented method of claim 1 further comprising:

traversing, by the computer, enforcement decision nodes connected by edges to nodes corresponding to hot information assets in the enforcement knowledge graph to identify a set of hot data users who accessed the hot information assets;

adding, by the computer, the set of hot data users who accessed the hot information assets to a hash table of hot data users; and generating, by the computer, a list of hot information assets and hot data users.

3. The computer-implemented method of claim 1 further comprising:

obtaining, by the computer, a list of hot information assets having the same terms as the right-hand side terms of the set of affected rules; and traversing, by the computer, the enforcement knowledge graph to identify nodes corresponding to similar information assets connected by edges tagged as similar to nodes having same terms as hot information assets listed in the list of hot information assets.

4. The computer-implemented method of claim 3 further comprising:

identifying, by the computer, a similarity edge weight of each of the edges tagged as similar;

comparing, by the computer, the similarity edge weight of each of the edges tagged as similar to a defined minimum similarity edge weight threshold level;

identifying, by the computer, those nodes corresponding to similar information assets connected to edges having similarity edge weights greater than the defined minimum similarity edge weight threshold level; and adding, by the computer, the similar information assets corresponding to those nodes connected to edges having similarity edge weights greater than the defined minimum similarity edge weight threshold level to a hash table of similar information assets.

5. The computer-implemented method of claim 4 further comprising:

performing, by the computer, a comparison of the list of hot information assets to the hash table of similar information assets;

identifying, by the computer, a set of similar information assets listed in the hash table of similar information assets that are not also listed in the list of hot information assets based on the comparison;

adding, by the computer, the set of similar information assets listed in the hash table of similar information assets that are not also listed in the list of hot information assets to a hash table of predicted information assets; and generating, by the computer, a list of predicted information assets.

6. The computer-implemented method of claim 5 further comprising:

traversing, by a computer, the enforcement knowledge graph to identify a set of predicted data users connected to predicted information assets listed in the list of predicted information assets;

identifying, by the computer, a subset of predicted data users in the set of predicted data users connected to the predicted information assets that are not listed in a list of hot data users that have accessed hot information assets having same terms as right-hand side terms of the set of affected rules;

adding, by the computer, the subset of predicted data users connected to the predicted information assets that are not listed in the list of hot data users to a hash table of predicted data users;

determining, by the computer, a user context of previous information asset access by each predicted data user listed in the hash table of predicted data users;

obtaining, by the computer, a new rule space that includes a plurality of new rules for controlling access to information assets of an organization; and performing, by the computer, a prediction analysis to determine a likelihood of each predicted data user listed in the hash table of predicted data users accessing one or more of the predicted information assets based on the new rule space and the user context of previous information asset access by each predicted data user.

7. The computer-implemented method of claim 1 further comprising:

traversing, by the computer, the enforcement knowledge graph to identify historic accesses for hot information asset-hot data user pairs based on rules in an old rule space; and generating, by the computer, a historical result of the historic accesses for hot information asset-hot data and user pairs based on the old rule space by traversal of a historic enforcement node for a given user and information asset from the enforcement knowledge graph.

8. The computer-implemented method of claim 7 further comprising:

performing, by the computer, a prediction analysis to determine predicted accesses for predicted information asset-predicted data user pairs based on a plurality of new rules in a new rule space; and generating, by the computer, a predictive result of the predicted accesses for predicted information asset-predicted data and user pairs based on actual rule evaluation for a given user and information asset using the new rule space.

9. The computer-implemented method of claim 8 further comprising:

performing, by the computer, a differential analysis of the historical result of the historic accesses based on the old rule space and the predictive result of the predicted accesses based on the new rule space; and generating, by the computer, a rule change impact result on information asset access based on the differential analysis.

10. The computer-implemented method of claim 9, wherein the computer renders the rule change impact result on the information asset access as a polar plot that is radially-scaled arranging assets in a radial dimension with most recently-accessed assets located near a center of the polar plot and least recently-accessed assets located near an end of a radial line, and wherein the polar plot is color-coded.

11. The computer-implemented method of claim 9, wherein resultant data of the rule change impact result fundamentally represents four independent pieces of information contained in a result, and wherein the computer combines the four independent pieces of information to present differential analysis by super position and color coding of overlaid polar plot points representing information assets and users depending on user-requested differential analysis request, and wherein the four independent pieces of information are selected from a group consisting of access decisions with historic users and information assets in the old rule space, access decisions with historic users and information assets in the new rule space, access decisions with predicted users and information assets in the old rule space, and access decisions with predicted users and information assets in the new rule space, and wherein the computer provides super position of the access decisions with historic users and information assets in the old and new rule spaces and super position of the access decisions with predicted users and information assets in the old and new rule spaces with appropriate color coding.

12. A computer system for predicting access impact of a plurality of rule changes on a corpus of information assets, the computer system comprising:

a bus system;

a storage device connected to the bus system, wherein the storage device stores program instructions; and a processor connected to the bus system, wherein the processor executes the program instructions to:

receive a set of affected rules in a new rule space for controlling access to the corpus of information assets;

shred the set of affected rules to identify right-hand side terms contained in predication blocks of the set of affected rules;

traverse an enforcement knowledge graph to identify a set of hot information assets having same terms as the right-hand side terms of the set of affected rules, wherein the enforcement knowledge graph comprises a hypergraph that contains a current state of information assets and user domains and provides probabilistic information asset access predictors over a general information asset space of the organization, and wherein the set of hot information assets comprises information assets within the corpus of information assets with a high rate of historic access by users as compared to historic access by users of other information assets within the corpus of information assets; and add the set of hot information assets having the same terms as the right-hand side terms of the set of affected rules to a hash table of hot information assets.

13. The computer system of claim 12, wherein the processor further executes the program instructions to:

traverse enforcement decision nodes connected by edges to nodes corresponding to hot information assets in the enforcement knowledge graph to identify a set of hot data users who accessed the hot information assets;

add the set of hot data users who accessed the hot information assets to a hash table of hot data users; and generate a list of hot information assets and hot data users.

14. A computer program product for predicting access impact of a plurality of rule changes on a corpus of information assets, the computer program product comprising:

a computer-readable storage medium having program instructions embodied therewith, the program instructions executable by a computer to cause the computer to perform the steps of:

receiving, by the computer, a set of affected rules in a new rule space for controlling access to the corpus of information assets;

shredding, by the computer, the set of affected rules to identify right-hand side terms contained in predication blocks of the set of affected rules;

traversing, by the computer, an enforcement knowledge graph to identify a set of hot information assets having same terms as the right-hand side terms of the set of affected rules, wherein the enforcement knowledge graph comprises a hypergraph that contains a current state of information assets and user domains and provides probabilistic information asset access predictors over a general information asset space of the organization, and wherein the set of hot information assets comprises information assets within the corpus of information assets with a high rate of historic access by users as compared to historic access by users of other information assets within the corpus of information assets; and adding, by the computer, the set of hot information assets having the same terms as the right-hand side terms of the set of affected rules to a hash table of hot information assets.

15. The computer program product of claim 14 further comprising:

traversing, by the computer, enforcement decision nodes connected by edges to nodes corresponding to hot information assets in the enforcement knowledge graph to identify a set of hot data users who accessed the hot information assets;

adding, by the computer, the set of hot data users who accessed the hot information assets to a hash table of hot data users; and generating, by the computer, a list of hot information assets and hot data users.

16. The computer program product of claim 14 further comprising:

obtaining, by the computer, a list of hot information assets having the same terms as the right-hand side terms of the set of affected rules; and traversing, by the computer, the enforcement knowledge graph to identify nodes corresponding to similar information assets connected by edges tagged as similar to nodes having same terms as hot information assets listed in the list of hot information assets.

17. The computer program product of claim 16 further comprising:

identifying, by the computer, a similarity edge weight of each of the edges tagged as similar;

comparing, by the computer, the similarity edge weight of each of the edges tagged as similar to a defined minimum similarity edge weight threshold level;

identifying, by the computer, those nodes corresponding to similar information assets connected to edges having similarity edge weights greater than the defined minimum similarity edge weight threshold level; and adding, by the computer, the similar information assets corresponding to those nodes connected to edges having similarity edge weights greater than the defined minimum similarity edge weight threshold level to a hash table of similar information assets.

18. The computer program product of claim 17 further comprising:

performing, by the computer, a comparison of the list of hot information assets to the hash table of similar information assets;

identifying, by the computer, a set of similar information assets listed in the hash table of similar information assets that are not also listed in the list of hot information assets based on the comparison;

adding, by the computer, the set of similar information assets listed in the hash table of similar information assets that are not also listed in the list of hot information assets to a hash table of predicted information assets; and generating, by the computer, a list of predicted information assets.

19. The computer program product of claim 18 further comprising:

traversing, by a computer, the enforcement knowledge graph to identify a set of predicted data users connected to predicted information assets listed in the list of predicted information assets;

identifying, by the computer, a subset of predicted data users in the set of predicted data users connected to the predicted information assets that are not listed in a list of hot data users that have accessed hot information assets having same terms as right-hand side terms of the set of affected rules;

adding, by the computer, the subset of predicted data users connected to the predicted information assets that are not listed in the list of hot data users to a hash table of predicted data users;

determining, by the computer, a user context of previous information asset access by each predicted data user listed in the hash table of predicted data users;

obtaining, by the computer, a new rule space that includes a plurality of new rules for controlling access to information assets of an organization; and performing, by the computer, a prediction analysis to determine a likelihood of each predicted data user listed in the hash table of predicted data users accessing one or more of the predicted information assets based on the new rule space and the user context of previous information asset access by each predicted data user.

20. The computer program product of claim 14 further comprising:

traversing, by the computer, the enforcement knowledge graph to identify historic accesses for hot information asset-hot data user pairs based on rules in an old rule space; and generating, by the computer, a historical result of the historic accesses for hot information asset-hot data and user pairs based on the old rule space by traversal of a historic enforcement node for a given user and information asset from the enforcement knowledge graph.

* * * * *